United States Patent
Lee et al.

(10) Patent No.: US 9,825,485 B2
(45) Date of Patent: Nov. 21, 2017

(54) WIRELESS POWER TRANSMITTER AND WIRELESS POWER RECEIVER

(71) Applicant: Samsung Electronics Co., Ltd., Gyeonggi-do (KR)

(72) Inventors: Byoung-Hee Lee, Gyeonggi-do (KR); Sang-Wook Kwon, Gyeonggi-do (KR); Ki-Young Kim, Gyeonggi-do (KR); Ji-Hoon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 79 days.

(21) Appl. No.: 14/867,957

(22) Filed: Sep. 28, 2015

(65) Prior Publication Data
US 2016/0094081 A1    Mar. 31, 2016

(30) Foreign Application Priority Data

Sep. 26, 2014    (KR) .................. 10-2014-0129435

(51) Int. Cl.
*H02J 7/02*        (2016.01)
*H02J 5/00*        (2016.01)
(Continued)

(52) U.S. Cl.
CPC .............. *H02J 7/025* (2013.01); *H02J 5/005* (2013.01); *H02J 7/04* (2013.01); *H02J 50/12* (2016.02)

(58) Field of Classification Search
CPC .. H02J 7/025; H02J 50/12; H02J 5/005; H02J 7/04
(Continued)

(56) References Cited

U.S. PATENT DOCUMENTS 8,638,062 B2    1/2014    Baarman et al.
8,729,734 B2 *  5/2014    Cook ............... H01F 38/14
                                                  307/104
(Continued)

FOREIGN PATENT DOCUMENTS

EP      2 667 481        11/2013
KR      10-2004-0031196   4/2004
(Continued)

OTHER PUBLICATIONS

International Search Report dated Jan. 6, 2016 issued in counterpart application No. PCT/KR2015/010013, 7 pages.
(Continued)

*Primary Examiner* — Edward Tso
*Assistant Examiner* — Sailesh Thapa
(74) *Attorney, Agent, or Firm* — The Farrell Law Firm, P.C.

(57) ABSTRACT

A wireless power transmitter is provided. The wireless power transmitter includes a power supply unit that supplies Alternating Current (AC) power having a predetermined voltage value, a rectification unit that is connected to the power supply unit, and rectifies the AC power, a voltage adjustment unit that is connected to the rectification unit, and adjusts a magnitude of an output voltage value of the rectified power, and outputs the adjusted power to a power transmission unit, the power transmission unit that generates the adjusted power output from the voltage adjustment unit as a signal in a form in which wireless power transmission is possible, and transmits the generated signal to a wireless power receiver, and a control unit that controls the magnitude of the output voltage value of the rectified power to be adjusted by the voltage adjustment unit in accordance with a predetermined criterion.

17 Claims, 12 Drawing Sheets

(51) Int. Cl.
*H02J 7/04* (2006.01)
*H02J 50/12* (2016.01)

(58) Field of Classification Search
USPC .......................................... 320/108
See application file for complete search history.

(56) References Cited

U.S. PATENT DOCUMENTS

| | | | |
|---|---|---|---|
| 2012/0299390 A1 | 11/2012 | Kim et al. | |
| 2013/0029595 A1 | 1/2013 | Widmer et al. | |
| 2013/0257167 A1 | 10/2013 | Singh | |
| 2013/0307473 A1 | 11/2013 | Han et al. | |
| 2014/0145516 A1* | 5/2014 | Hirosawa | B60L 11/182 307/104 |
| 2015/0054456 A1* | 2/2015 | Yamakawa | B60L 11/182 320/108 |
| 2016/0118179 A1* | 4/2016 | Park | H01F 27/2871 320/108 |

FOREIGN PATENT DOCUMENTS

| | | |
|---|---|---|
| KR | 10-2012-0133081 | 12/2012 |
| KR | 10-2013-0128565 | 11/2013 |
| WO | WO 2012/169861 | 12/2012 |
| WO | WO 2013/176751 | 11/2013 |
| WO | WO 2014/073863 | 5/2014 |

OTHER PUBLICATIONS

European Search Report dated Aug. 18, 2017 issued in counterpart application No. 15845329.0-1804, 8 pages.

* cited by examiner

WIRELESS POWER TRANSMITTER AND WIRELESS POWER RECEIVER

PRIORITY

This application claims priority under 35 U.S.C. §119(a) to Korean Patent Application Serial No. 10-2014-0129435, which was filed in the Korean Intellectual Property Office on Sep. 26, 2014, the entire content of which is incorporated herein by reference.

BACKGROUND

1. Field of Invention

The present invention relates generally to a wireless power transmitter and a wireless power receiver, which may use a wireless power transmission technology and a technology capable of rapidly charging a battery.

2. Description of the Related Art

Using wired power transmission technology, charging is made possible only when a charger and a device to be charged are directly connected with each other in a wired manner or are connected with each other by a contact point. Thus, in order to charge the device using such technology, it is necessary for a user to perform an operation of directly connecting the device and the charger. This may cause an inconvenience in accordance with the appearance of a variety of portable devices using a battery and may result in a decrease in the amount of use thereof. There may also be an inconvenience caused by the complex location of power cables for the respective devices. In order to address problems of such a wired charging method, wireless power transmission technology has been developed and various studies thereon have been conducted.

The wireless power transmission technology is a technology that transmits power without a direct line or a contact point between the charger and a device desired to be charged, and has been recently and widely applied even to Electric Vehicles (EV) as well as smart phones and tablet PCs. The wireless power transmission technology may be classified into inductive, capacitive, and resonance methods in accordance with the method. The respective methods have advantages and disadvantages in terms of implementation or efficiency, and the electromagnetic inductive method and the resonance method are standardized and take the lead in the technologies. A significant difference between the two methods is that the operating frequency is in a range of several hundred kHz in the electromagnetic inductive method and the operating frequency is in a range of several MHz in the resonance method. In the electromagnetic inductive method, charging is made possible with high efficiency in a short charging distance, and in the resonance method, a charging distance may be increased.

A conventional wireless charging system to which the above-described wireless power transmission technology is applied generally includes a power transmitter and a power receiver.

FIG. 9 is a block diagram of a conventional wireless charging system, according to the related art.

Referring to FIG. 9, a conventional power transmitter 910 includes a single-phase or three-phase Alternating Current (AC) power supply unit 911, an adapter 914 for generating power required by a power transmission unit 915 for wireless charging from the AC power supply unit 911, and the power transmission unit 915 for generating power as a signal in the form in which wireless power transmission is possible.

The adapter 914 includes an AC/DC converter unit 912 and a DC/DC converter unit 913 to which a Power Factor Correction (PFC) circuit is applied, and power factor correction among roles of the AD/DC converter unit 912 constituting the adapter 914 may be an important function in accordance with the capacity of the adapter 914. For example, an adapter having a capacity of 75 W or larger among adaptors for a notebook should have a PFC function. In a case in which the PFC function is not required, a PFC portion can be seen as an AC/DC converter that converts AC power into DC power.

A conventional power receiver 930 includes a power reception unit 931 for generating Direct Current (DC) power using the signal generated from the power transmission unit 915 of the power transmitter 910, a DC/DC converter unit 932 for generating power in the form suitable for a charger Integrated Circuit (IC) 933 for charging a battery 934, the charger IC 933, and the battery 934.

In the structure of the wireless charging system as shown in FIG. 9, each of the power conversion units (the AC/DC converter unit 912, the DC/DC converter unit 913, a power transmission unit 915, a power reception unit 931, a DC/DC converter unit 932, and the charger IC 933) has a different power conversion efficiency according to the design specifications, but has efficiency characteristics of approximately 80% or more.

FIG. 10 is a graph illustrating efficiency characteristics in accordance with an output current and an input voltage of a conventional DC/DC converter unit, according to the related art.

Referring to FIG. 10 a graph showing efficiency characteristics according to an output current and an input voltage of the DC/DC converter unit 913 is provided. The graph displays efficiency characteristics of approximately 80%. The wireless charging system of FIG. 9 is subjected to power conversion operations of a total of six power conversion units, and transmits power to the battery 934 from the AC power supply unit 911, by which the battery 934 can be charged. Thus, when it is assumed that the efficiency of each power conversion unit is 80%, about 26% of power is transmitted to the battery 934 when 100% of power is supplied from the AC power supply unit 911. Meanwhile, when the efficiency of each power conversion unit is 80%, a larger amount of power may be transmitted.

A conventional battery charging method which has been most widely used in charging a battery is a Constant Current-Constant Voltage (CC-CV) charging method. The CC-CV charging method is a method that initially performs constant current charging and then performs charging using a constant voltage in the future, and many studies on the CC-CV charging method have been conducted, so that the CC-CV charging method may be implemented using an IC which is commercially available. However, in the conventional CC-CV method, several hours are typically required for charging from a fully discharged state of a battery to a fully charged state thereof, which is inconvenient for users. Thus, in order to address the problem in the battery charge time, studies on a rapid charging technology capable of rapidly charging the battery have been conducted. In addition, there are demands for the development of a rapid charging technology, such as the development of rapid chargers, rapid charging batteries, etc., due to the capacity limit of the battery in consideration of the power consumption increase of devices using a battery and the ease of the movement thereof.

To this end, a rapid charging technology in which a charging current is configured in the form of a multi-step in an initial CC charging section in the conventional CC-CV charging method has been developed. This technology applies a boost charging method that performs charging for a predetermined time using a current larger than that in the existing CC charging method as an initial charging current value.

FIG. 11 is a graph illustrating a profile of a boost charging technology among conventional rapid charging technologies, according to the related art.

Referring to FIG. 11, a profile of the boost charging method among the conventional rapid charging technology is provided. The boost charging method has an advantage in that initial charging is performed using a current larger than a CC current value in the CC-CV charging and then charging is performed in the existing CC-CV method when reaching a predetermined condition, thereby reducing a charging time.

As described above, in the conventional rapid charging technology, it is possible to reduce the charging time compared to the CC-CV charging method, but safety problems such as the reduction in the battery life due to a large current charge, the occurrence of a defect of a battery during charging, and the like have been reported.

Important requirements in the wireless power transmission and the rapid charging technology are the efficiency of a charging system and the ease of implementation thereof. However, in the case of the conventional wireless charging system to which the wireless power transmission technology is applied, an existing commercial adaptor is adopted and a charger IC of a charger is used as is, and thereby there are problems such as an increase in the structural complexity and an increase in costs. In addition, in the case of the technology in which the charging current in the initial CC charging section is configured in the form of multi-step in the conventional CC-CV charging method among the rapid charging technologies, the charging current in the initial CC charging section is configured in the form of multi-step, and thereby there is a problem of the system efficiency lower than that in the wired power transmission technology. In addition, in the implementation of the system to which the conventional rapid charging technology is applied, the complexity in the implementation is increased. For example, the conventional boost charging technology has a problem of a substantial increase in the complexity of the system implementation compared to the CC-CV method.

SUMMARY

The present invention has been made to address at least the problems and disadvantages described above, and to provide at least the advantages described below.

Accordingly, an aspect of the present invention is to provide a wireless charging system using a combination of the wireless power transmission technology and the rapid charging technology to eliminate the inconvenience of the wired charging technology and to reduce the charging time of a battery.

Accordingly, another aspect of the present invention is to provide a wireless charging system which increases an amount of power ultimately transmitted to a battery by reducing the number of power conversion units while maintaining the efficiency of each of the power conversion units and an amount of supplied power as that provided in the related art, and thereby permitting rapid charging of the battery.

Accordingly, another aspect of the present invention is to provide a wireless charging system in which the complexity in the implementation of the conventional wired power transmission technology and rapid charging technology is resolved and the efficiency is improved.

Accordingly, another aspect of the present invention is to provide a wireless charging system whereby, when a change in a current in which rapid charging is performed is not fast, battery charging is made possible using an Alternating Current (AC)/Direct Current (DC) converter without the DC/DC converter, thereby obtaining a simplified configuration of a wireless charging system; thereby reducing the size and the cost of the wireless charging system, and reduce costs.

Accordingly, another aspect of the present invention is to provide a simplified and efficient wireless charging system that is applicable to various devices using a battery.

In accordance with an aspect of the present invention, a wireless power transmitter is provided. The wireless power transmitter includes a power supply unit that supplies Alternating Current (AC) power having a predetermined voltage value, a rectification unit that is connected to the power supply unit, and rectifies the AC power, a voltage adjustment unit that is connected to the rectification unit, adjusts a magnitude of an output voltage value of the rectified power, and outputs the adjusted power to a power transmission unit, the power transmission unit that generates the adjusted power output from the voltage adjustment unit as a signal in a form in which wireless power transmission is possible, and transmits the generated signal to a wireless power receiver, and a control unit that controls the magnitude of the output voltage value of the rectified power to be adjusted by the voltage adjustment unit in accordance with a predetermined criterion.

In accordance with another aspect of the present invention, a wireless power transmitter is provided. The wireless power transmitter includes a power supply unit that supplies Alternating Current (AC) power having a predetermined voltage value, a rectification unit that is connected to the power supply unit, and rectifies the AC power, a voltage adjustment unit that is connected to the rectification unit, adjusts a magnitude of an output voltage value of the rectified power, and outputs the adjusted power to a power transmission unit, a Direct Current (DC)/DC converter unit that converts the adjusted power output from the voltage adjustment unit into a predetermined gain, and transmits the converted power to the power transmission unit, the power transmission unit that generates the converted power output from the DC/DC converter unit as a signal in a form in which wireless power transmission is possible, and transmits the generated signal to a wireless power receiver, and a control unit that controls the magnitude of the output voltage value of the rectified power to be adjusted by the voltage adjustment unit or a magnitude of an output voltage value of the converted power to be adjusted by the DC/DC converter unit in accordance with a predetermined criterion.

In accordance with still another aspect of the present invention, a wireless power receiver is provided. The wireless power receiver includes a power reception unit that receives power from a wireless power transmitter; and a charging unit that uses or stores the power, and is connected to an output unit of the power reception unit without a Direct Current(DC)/DC converter unit.

In accordance with yet another aspect of the present invention, a wireless charging system is provided. The wireless charging system includes a wireless power transmitter that includes a power supply unit that supplies Alternating Current (AC) power having a predetermined voltage value, a rectification unit that is connected to the power supply unit and rectifies the AC power, a voltage adjustment unit that is connected to the rectification unit, adjusts a magnitude of an output voltage value of the rectified power, and outputs the adjusted power to a power transmission unit, the power transmission unit that generates the adjusted power output from the voltage adjustment unit as a signal in a form in which wireless power transmission is possible, and transmits the generated signal to a wireless power receiver, and a control unit that controls the magnitude of the output voltage value of the rectified power to be adjusted by the voltage adjustment unit in accordance with a predetermined criterion, and a wireless power receiver that includes a power reception unit that receives power from the wireless power transmitter, and a charging unit that uses or stores the power and is connected to an output unit of the power reception unit without a Direct Current (DC)/DC converter unit.

In accordance with a further aspect of the present invention, a wireless charging system is provided. The wireless charging system includes a wireless power transmitter that includes a power supply unit that supplies Alternating Current (AC) power having a predetermined voltage value, a rectification unit that is connected to the power supply unit and rectifies the AC power, a voltage adjustment unit that is connected to the rectification unit, adjusts a magnitude of an output voltage value of the rectified power, and outputs the adjusted power to a power transmission unit, a Direct Current(DC)/DC converter unit that converts the adjusted power output from the voltage adjustment unit into a predetermined gain and transmits the converted power to the power transmission unit, the power transmission unit that generates the converted power output from the DC/DC converter unit as a signal in a form in which wireless power transmission is possible and transmits the generated signal to a wireless power receiver, and a control unit that controls the magnitude of the output voltage value of the rectified power to be adjusted by the voltage adjustment unit or a magnitude of an output voltage value of the converted power to be adjusted by the DC/DC converter unit in accordance with a predetermined criterion, and a wireless power receiver that includes a power reception unit that receives power from the wireless power transmitter, and a charging unit that uses or stores the power and is connected to an output unit of the power reception unit without a DC/DC converter unit.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
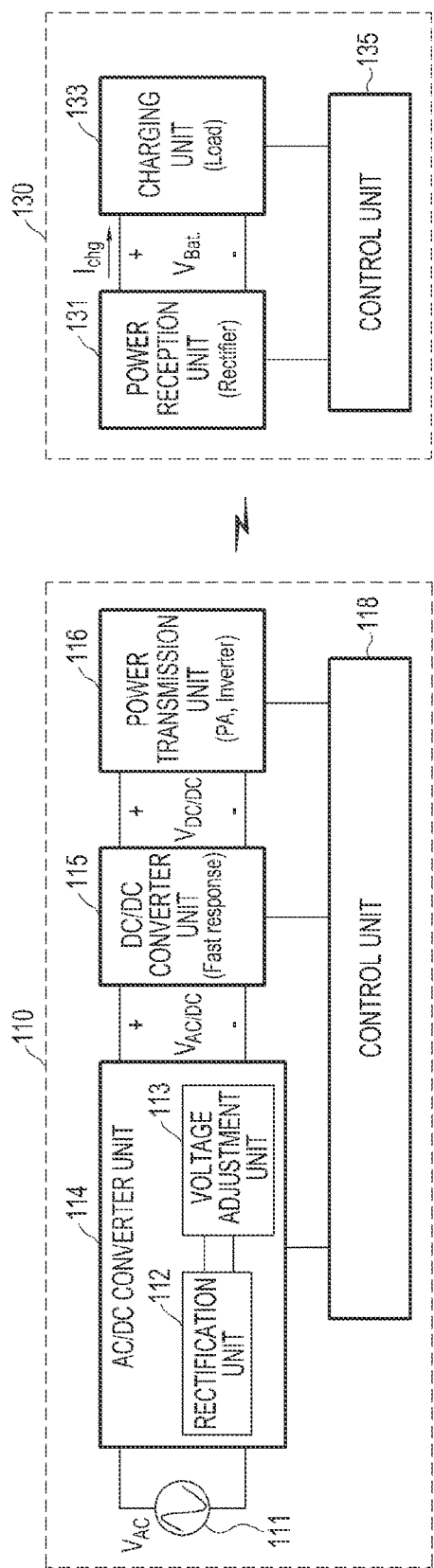
FIG. 1 is a block diagram of a wireless charging system, according to an embodiment of the present invention.

Hereinafter, various embodiments of the present invention will be described with reference to the accompanying drawings. Specific examples are illustrated in the drawings and described in the description, however, the present invention may be modified in various forms and include various embodiments. It should be understood that there is no intent to limit the present invention to the particular forms disclosed herein; rather, the present invention should be construed to cover all modifications, equivalents, and/or alternatives falling within the spirit and scope of the invention. In the description of the drawings, identical or similar reference numerals are used to designate identical or similar elements.

As used herein, the terms "include" and "may include" refer to the existence of a corresponding disclosed function, operation or component which can be used in various embodiments of the present invention and does not limit one or more additional functions, operations, or components. In the present disclosure, terms such as "include" and "have" may be construed to denote a certain characteristic, number, step, operation, constituent element, component or a combination thereof, but should not be construed to exclude the existence of or a possibility of addition of one or more other characteristics, numbers, steps, operations, constituent elements, components or combinations thereof.

As used herein, the expressions "or" and "at least one of A or/and B" include any or all of combinations of words listed together. For example, the expression "A or B" and "at least A or/and B" may include A, may include B, or may include both A and B.

The expressions "1", "2", "first", or "second" used herein may modify various components of various embodiments but does not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present invention, a first component element may be referred to as a second component element. Similarly, the second component element also may be referred to as the first component element.

It should be noted that if it is described that one component element is "coupled" or "connected" to another component element, the first component element may be directly coupled or connected to the second component, and a third component element may be "coupled" or "connected"

between the first and second component elements. Conversely, when one component element is "directly coupled" or "directly connected" to another component element, it may be construed that a third component element does not exist between the first component element and the second component element.

The terms, as used herein, describe a specific embodiment, and are not intended to limit the present invention. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present invention belongs would understand the terms to have. Such terms as those defined in a generally used dictionary are to be interpreted to have meanings equivalent to the contextual meanings in the relevant field of art, and are not to be interpreted to have ideal or excessively formal meanings unless clearly defined in the present invention.

FIG. 1 is a block diagram of a wireless charging system, according an embodiment of the present invention.

Referring to FIG. 1, a wireless charging system according to an embodiment of the present invention has a structure in which a DC/DC converter unit and a charger integrated circuit (hereinafter, "charger IC") components of a conventional wireless charging system are removed from a power receiver. The DC/DC converter unit and the charger IC of the conventional power receiver can be removed because an Alternating Current (AC)/Direct Current (DC) converter unit 114 is provided in a power transmitter 110 to thereby generate a charging profile ($V_{BAT}$, $I_{chg}$) that is used in charging of a charging unit 133 (hereinafter, referred to as a "battery").

For example, when a battery is made equivalent to a resistor, a battery charging current ($I_{chg}$) may be generated into a desired type by controlling a voltage ($V_{BAT}$) applied to the battery. For example, when the voltage ($V_{BAT}$) applied to the battery is increased, the charging current ($I_{chg}$) is increased, and when the voltage ($V_{BAT}$) applied to the battery is reduced, the charging current ($I_{chg}$) is reduced.

In the present invention, a structure in which the voltage ($V_{BAT}$) applied to the battery is changed by adjusting a control factor of the AC/DC converter unit 114 of the power transmitter 110 is proposed. For example, when adjusting an output voltage ($V_{AC/DC}$) of the AC/DC converter unit 114, an input voltage of the power transmitter 116 may be adjusted, and consequently, the voltage ($V_{BAT}$) applied to the battery may be adjusted.

Referring back to FIG. 1, more specifically, a wireless charging system, according to an embodiment of the present invention, includes the power transmitter 110 and a power receiver 130. The power transmitter 110 includes a power supply unit 111, the AC/DC converter unit 114, a DC/DC converter unit 115, a power transmission unit 116, and a control unit 118. In addition, the AC/DC converter unit 114 may include a rectification unit 112 and a voltage adjustment unit 113. The power receiver 130 includes a power reception unit 131, the charging unit 133, and a control unit 135. In the power transmitter 110, the power supply unit 111 supplies AC power having a predetermined voltage ($V_{AC}$).

The rectification unit 112 of the AC/DC converter unit 114 is connected to the power supply unit 111, and rectifies the AC power received from the power supply unit 111. The rectification unit 112 may be implemented by a known rectification circuit, for example, a means such as a diode, and it will be easily understood by those skilled in the art that various means capable of performing rectification are applicable.

The voltage adjustment unit 113 of the AC/DC converter unit 114 is connected to the rectification unit 112 and the DC/DC converter unit 115, and adjusts the magnitude of an output voltage ($V_{AC/DC}$) value of the power that is rectified in the rectification unit 112 and outputs the adjusted voltage to the DC/DC converter unit 115, in accordance with a control signal of the control unit 118. In addition, the voltage adjustment unit 113 may be implemented by a circuit including a switch that is turned on and off in accordance with the control of the control unit 118, for example, a conventional step-down, step-up, or step-up-down circuit (e.g., a boost type, buck type, or buck-boost type circuit, etc.), and the magnitude of the output voltage value of the rectified power may be adjusted in accordance with the ON/OFF of the switch. A detailed description of an operation in which the voltage adjustment unit 113 adjusts the magnitude of the output voltage ($V_{AC/DC}$) value of the power output to the DC/DC converter unit 115 in accordance with the control signal of the control unit 118 will be provided below.

The DC/DC converter unit 115 may convert the power input from the voltage adjustment unit 113 into a predetermined gain, and transmit the converted power to the power transmission unit 116. In addition, the DC/DC converter unit 115 may adjust the magnitude of the output voltage ($V_{DC/DC}$) value of the power output to the power transmission unit 116, in accordance with the control signal of the control unit 118. The related detailed description will be provided later.

The power transmission unit 116 has a resonance coil as a main configuration, and thereby generates the output power having the output voltage ($V_{DC/DC}$) value whose magnitude is adjusted from the DC/DC converter unit 115, as a signal in the form in which wireless power transmission is possible, and transmits the generated signal to the wireless power receiver 130. When transmitting wireless power, the power transmission unit 116 transmits the power in the form of an AC waveform, or converts the power in the form of DC waveform into power in the form of an AC waveform using an inverter to thereby transmit the power in the form of an AC waveform while transmitting the power in the form of DC waveform. In addition, the power transmission unit 116 may include, for example, a known rectification circuit and a resonant circuit.

The control unit 118 controls the overall operations of the wireless power transmitter 110. In addition, the control unit 118 controls the overall operations of the wireless power transmitter 110 using an algorithm, a program, or an application required for the control, which is read from a storage unit. The control unit 118 may be implemented in the form of a CPU, a microprocessor, or a mini-computer.

The control unit 118 may control to adjust the magnitude of the output voltage value of the voltage adjustment unit 113 or the DC/DC converter unit 115 in accordance with a predetermined criterion in order to change the battery charging current ($I_{chg}$), and the related detailed description will be provided.

The power reception unit 131 of the power receiver 130 has a resonance coil as a main configuration, and thereby receives the wireless power transmitted from the power transmitter 110. The power reception unit 131 may include, for example, a known resonance means and a rectification means. The power reception unit 131 is connected directly to the charging unit 133 without a DC/DC converter unit and a charging IC which are provided in the conventional power receiver.

The charging unit 133 uses or stores power, and may be implemented as a battery when the power receiver 130 is a mobile phone or a smartphone. Hereinafter, a case in which the charging unit 133 is a battery will be described.

The control unit 135 controls the overall operations of the wireless power receiver 130.

Figure 2A:
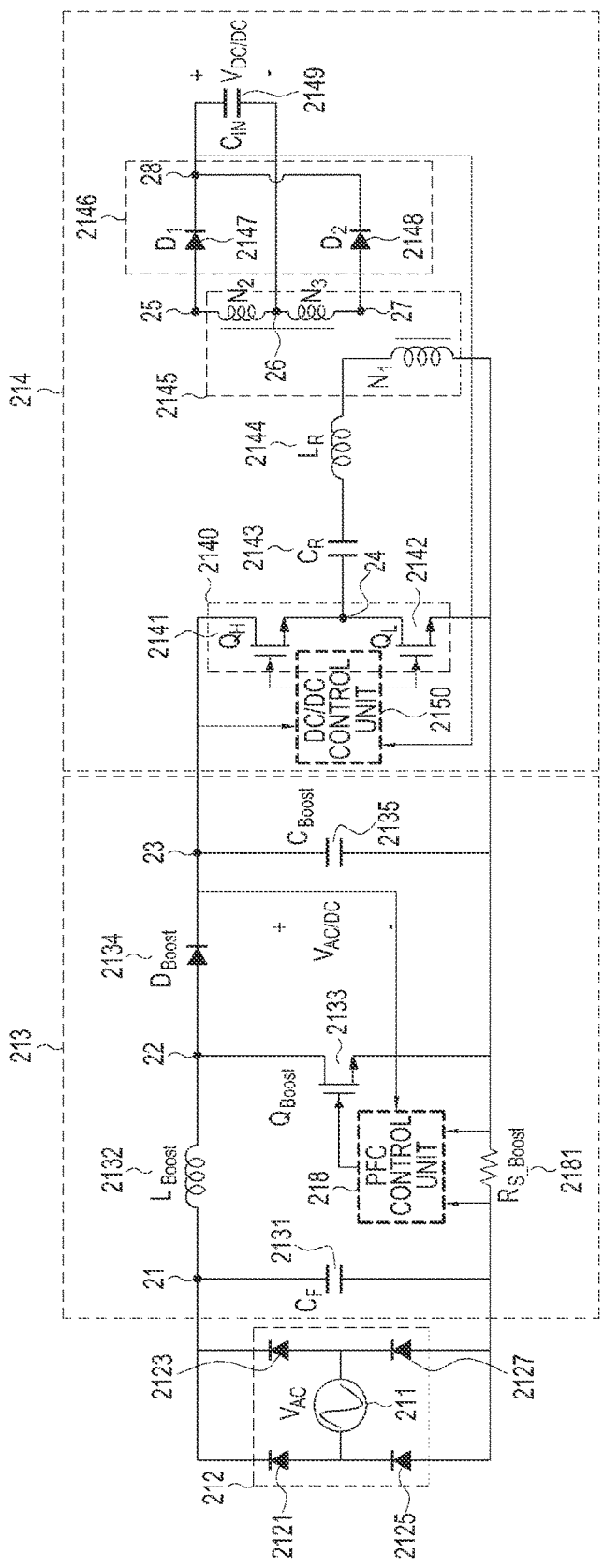
FIGS. 2A and 2B are circuit diagrams of a wireless charging system, according to an embodiment of the present invention.
Figure 2B:
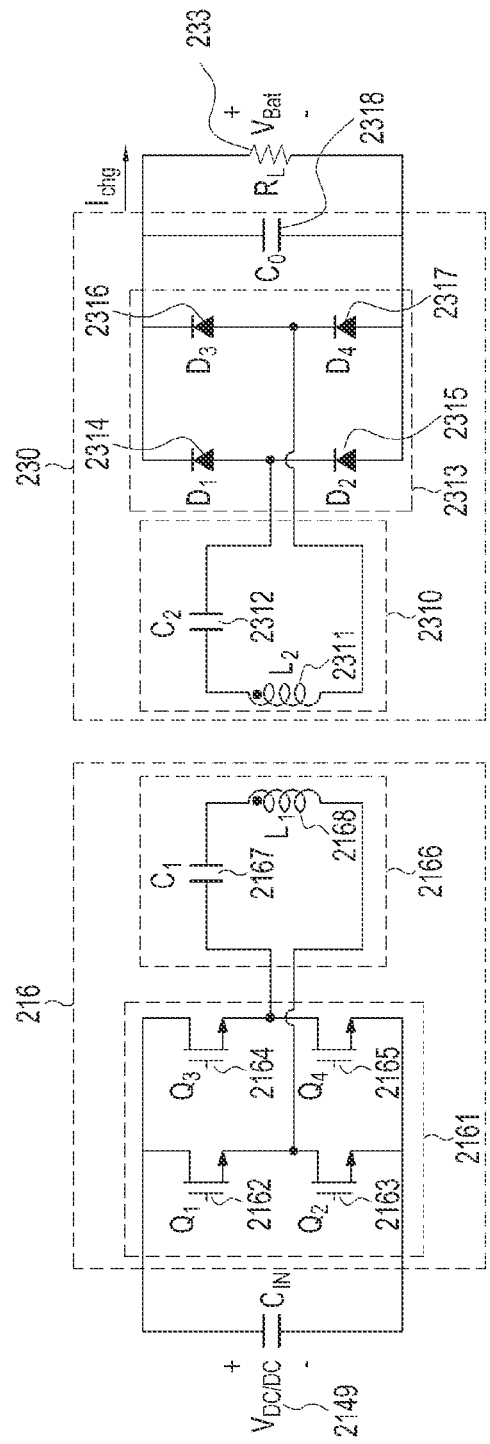

FIGS. 2A and 2B are circuit diagrams of a wireless charging system, according to an embodiment of the present invention.

Referring to FIGS. 2A and 2B, a configuration of a wireless charging system in which the AC/DC converter unit is implemented as a boost type PFC circuit is provided.

Referring to FIG. 2A, a configuration of the power transmitter is provided. A power supply unit 211 is connected to a rectification unit 212. The rectification unit 212 is a full-bridge diode, and includes four diodes 2121, 2123, 2125, and 2127. One end of each of the two diodes 2121 and 2123 is connected to a node 21, and the other end thereof is connected to the power supply unit 211. One end of each of the two diodes 2125 and 2127 is connected to the power supply unit 211, and the other end thereof is connected to a ground terminal.

A voltage adjustment unit 213 connected to the rectification unit 212 includes a capacitor ($C_F$) 2131, an inductor ($L_{Boost}$) 2132, a switch ($Q_{Boost}$) 2133, a diode ($D_{Boost}$) 2134, a capacitor ($C_{Boost}$) 2135, and a PFC control unit 218. The switch 2133 may be a MOSFET element (hereinafter MOSFET 2133), and a case in which the switch 2133 is the MOSFET element will be herein described.

One end of the capacitor 2131 is connected to the node 21, and the other end thereof is connected to the ground terminal. One end of the inductor 2132 is connected to the node 21, and the other end thereof is connected to a node 22. The node 22 is connected to one end of the diode 2134 and a drain terminal of the MOSFET element 2133. A gate terminal of the MOSFET 2133 is connected to the PFC control unit 218 to receive a control signal of the PFC control unit 218, and a source terminal of the MOSFET 2133 is connected to a ground terminal. The other end of the diode 2134 is connected to a node 23. One end of the capacitor 2135 is connected to the node 23, and the other end thereof is connected to a ground terminal. The PFC control unit 218 receives a voltage of the node 23, and is connected to a resistance circuit 2181.

The PFC control unit 218 may include, a comparator that generates a voltage corresponding to an output voltage value ($V_{AC/DC}$) to thereby convert a level of the voltage, receives a voltage value of the voltage whose level is converted and a predetermined reference voltage ($V_{ref}$) value of a reference voltage supply unit, and generates an output signal having a voltage value in accordance with a difference between the voltage value of the voltage whose level is converted and the reference voltage value, in accordance with the control of the control unit 118, and a modulation circuit that receives the output signal of the comparator and adjusts an operating frequency or an operating time of the switch 2133.

In addition, the PFC control unit 218 may include, a comparator that generates a voltage corresponding to an output voltage value ($V_{AC/DC}$), converts a reference voltage value of a reference voltage supply unit, receives a voltage value of the generated voltage and the converted reference voltage value, and generates an output signal having a voltage value in accordance with a difference between the voltage value of the generated voltage and the converted reference voltage value, in accordance with the control of the control unit 118, and a modulation circuit that receives the output signal of the comparator and adjusts an operating frequency or an operating time of the switch 2133.

The operation of the PFC control unit 218 will be described in more detail below.

The DC/DC converter unit 214 connected to the voltage adjustment unit 213 includes a switching unit 2140 including a first switch ($Q_H$) 2141 and a second switch ($Q_L$) 2142 each for switching an input voltage, a capacitor ($C_R$) 2143, an inductor ($L_R$) 2144, a transformer 2145 that transforms a primary-side voltage to a secondary-side voltage, a rectification unit 2146, a capacitor ($C_{IN}$) 2149, and a DC/DC control unit 2150. Hereinafter, a case in which each of the first switch 2141 and the second switch 2142 is a MOSFET element (hereinafter, MOSFET element 2141 and MOSFET element 2142) will be described.

A gate terminal of each of the two MOSFET elements 2141 and 2142 is connected to the DC/DC control unit 2150 to receive a control signal of the DC/DC control unit 2150. Here, a drain terminal of the MOSFET element 2141 is connected to the node 23 and a source terminal thereof is connected to a drain terminal of the MOSFET element 2142, and a source terminal of the MOSFET element 2142 is connected to a ground terminal. One end of the capacitor 2143 is connected to a node 24 between the source terminal of the MOSFET element 2141 and the drain terminal of the MOSFET terminal 2142, and the other end thereof is connected to one end of the inductor 2144. The other end of the inductor 2144 is connected to an input terminal of the transformer 2145, and an output terminal of the transformer 2145 is connected to the rectification unit 2146.

The rectification unit 2146 is a half-bridge diode, and includes two diodes (D1 and D2) 2147 and 2148, as shown in FIG. 2. One end of the diode 2147 is connected to a node 25 connected to a portion N2 of two portions N2 and N3 of the transformer 2145, one end of the diode 2148 is connected to a node 27 connected to a portion N3 of the two portions N2 and N3 of the transformer 2145, and the other end of the diode 2147 is connected to a node 28. The node 28 is connected to the other end of the diode 2148 and one end of the capacitor 2149, and the other end of the capacitor 2149 is connected to a tap terminal 26 of the transformer 2145.

Referring to FIG. 2B, configurations of the power transmission unit 216 and the power receiver unit 230 are provided.

The power transmission unit 216 is connected to the DC/DC converter unit 214, and includes a resonant signal generation unit 2161 and a resonance unit 2166.

The resonant signal generation unit 2161 is connected to the capacitor 2149 of the DC/DC converter unit 214, and includes four MOSFET elements (Q1, Q2, Q3, and Q4) 2162, 2163, 2164, and 2165.

The resonance unit 2166 is connected to the resonant signal generation unit 2161, and includes a capacitor 2167 and a coil 2168 to configure an LC series resonant circuit.

The DC/DC control unit 2150 receives a voltage ($V_{AC/DC}$) of the node 23 and a voltage ($V_{DC/DC}$) of the node 28. The detailed description of the DC/DC control unit 2150 will be provided later.

Figure 3:
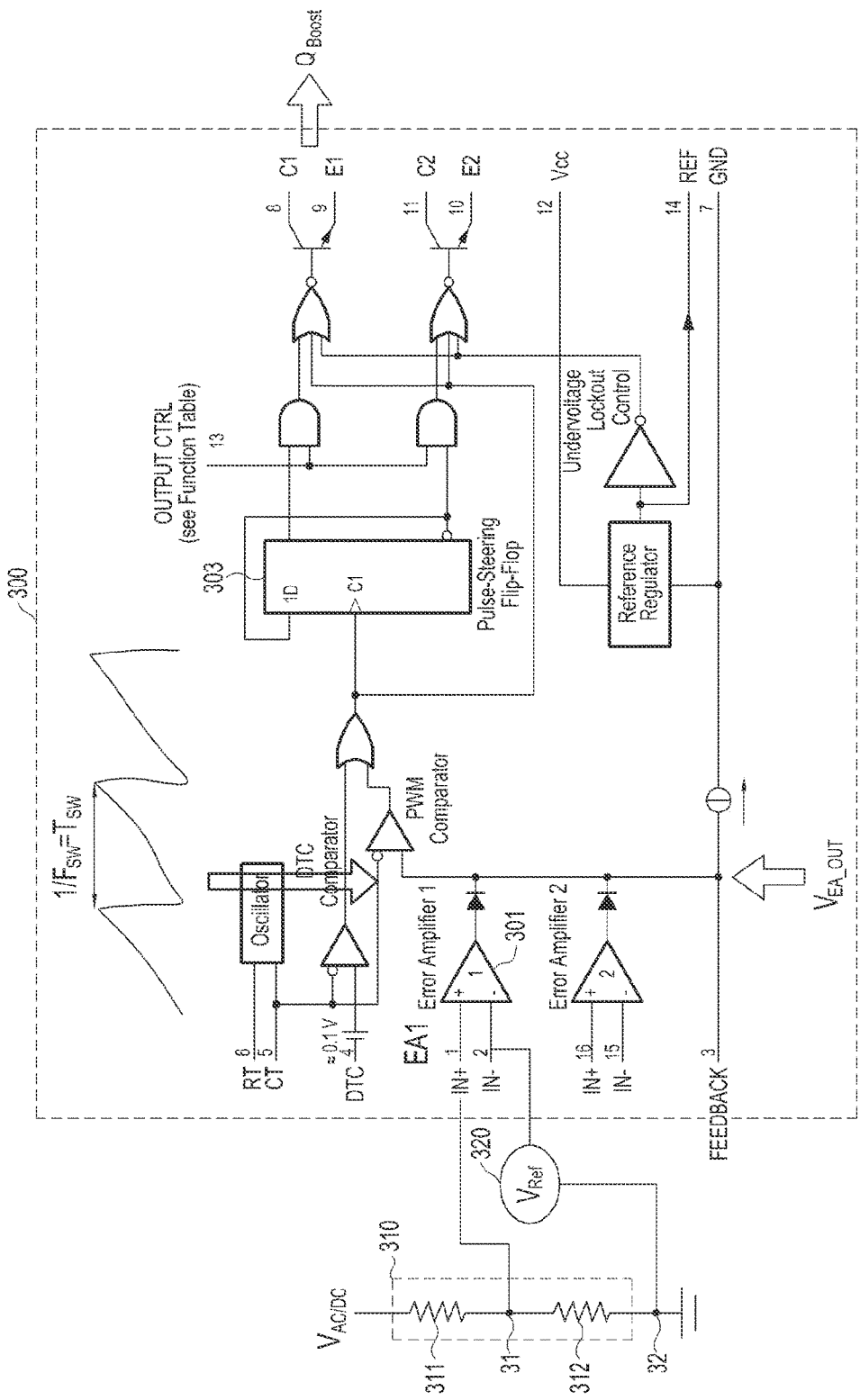
FIG. 3 is a circuit diagram of a Power Factor Correction (PFC) circuit of a voltage adjustment unit, according to an embodiment of the present invention.

The above-described PFC control unit 218 may be implemented as a conventional IC (hereinafter, referred to as a "Pulse Width Modulation (PWM) driving IC") as shown in FIG. 3.

FIG. 3 is a circuit diagram of a Power Factor Correction (PFC) circuit of a voltage adjustment unit, according to an embodiment of the present invention.

Referring to FIG. 3, a configuration and operation of the PFC control unit 218 is provided.

A PWM driving IC 300 includes a comparator (EA1) 301, and the comparator 301 may be an Operational Amplifier (Op Amp). A first input terminal (IN+) 1 of the comparator 301 is connected to an output terminal of a comparison voltage supply unit 310, and a second input terminal (IN1) 2 of the comparator 301 is connected to an output terminal of a reference voltage supply unit 320. In addition, the comparator 301 generates an output signal having a voltage value ($V_{EA\_OUT}$) in accordance with a difference between the voltage values of the first input terminal 1 and the second input terminal 2. The comparison voltage supply unit 310 is connected to the node 23, convert a voltage value ($V_{AC/DC}$) of the node 23 in accordance with the control of the control unit 118, and supplies the converted voltage value ($V_{AC/DC}$) to the first input terminal 1 of the comparator 301. In addition, the reference voltage supply unit 320 supplies a predetermined reference voltage ($V_{ref}$) value to the second input terminal 2 of the comparator 301.

The comparison voltage supply unit 310 includes a first resistor 311 and a second resistor 312, and the second resistor 312 is a resistor that is variable in accordance with the control signal of the control unit 118. One end of the first resistor 311 is connected to the node 23, and the other end thereof is connected to the node 31. One end of the second resistor 312 is connected to the node 31, and the other end thereof is connected to a ground terminal. The node 31 has a configuration in which it is connected to the first input terminal 1 of the comparator 301. In addition, the reference voltage supply unit 320 has a configuration in which it is connected to the node between the second resistor 312 and the ground terminal and connected to the second input terminal 2.

When a difference between the voltage values of the first input terminal 1 and the second input terminal 2 is reduced, the voltage value ($V_{EA\_OUT}$) of the output signal of the comparator 301 is reduced, and when the difference thereof is increased, the voltage value ($V_{EA\_OUT}$) of the output signal of the comparator 301 is increased. Consequently, the voltage value ($V_{EA\_OUT}$) of the output signal of the comparator 301 is changed until the difference between the voltage values of the first input terminal 1 and the second input terminal 2 disappears.

Meanwhile, the voltage value ($V_{EA\_OUT}$) of the output signal of the comparator 301 becomes a clock signal of Pulse-Steering Flip-Flop (PSFF) 303 when compared to a triangular wave having a predetermined period, which is generated from a CT 5. Whenever the clock signal of the PSFF 303 is applied, a signal is generated in pins 8 and 9, and when the signals generated in the pins 8 and 9 are transmitted to the switch 2133 of the voltage adjustment unit 213, the ON and OFF of the switch is repeated.

Depending on which number of pins among the pins 8 to 11 is connected to the switch of the voltage adjustment unit 213, a time during which the switch of the voltage adjustment unit 213 is kept on for one period may be increased or reduced, when the voltage value of the output signal of the comparator 301 is increased. For example, when the value of the output signal of the comparator 301 is increased, the time during which the switch of the voltage adjustment unit 213 is kept on for one period is increased, and when the value of the output signal of the comparator 301 is reduced, the time during which the switch of the voltage adjustment unit 213 is kept on for one period is reduced.

That is, the PFC control unit 218 converts the output voltage value ($V_{AC/DC}$) of the voltage adjustment unit 213 in accordance with the control of the control unit 118. For example, the PFC control unit 218 inputs the converted output voltage value ($V_{AC/DC}$) and the reference voltage ($V_{ref}$) value of the reference voltage supply unit 320 to the input terminal of the comparator 301, so that the comparator 301 may generate the output signal having the voltage value ($V_{EA\_OUT}$) in accordance with the difference between the converted output voltage value ($V_{AC/DC}$) and the reference voltage ($V_{ref}$) value. Thereafter, the PFC control unit 218 inputs the output signal generated from the comparator 301 to a pulse width modulation circuit, converts the signal generated from the comparator 301 through a pulse width modulation method, inputs the converted signal as the control signal of the switch 2133, and thereby changes a duty value of the switch 2133 of the voltage adjustment unit 213.

As described above, the PFC control unit 218 changes the duty value of the switch 2133 of the voltage adjustment unit 213 by adopting the pulse width modulation method in accordance with the control of the control unit 118, and thereby the magnitude of the output voltage value ($V_{AC/DC}$) of the voltage adjustment unit 213 is adjusted. A ratio of the output voltage to the input voltage of the voltage adjustment unit 213 is increased along with an increase in the duty value which is a time during which the switch 2133 is kept on for one switching period. In addition, the magnitude of the output voltage value ($V_{AC/DC}$) of the voltage adjustment unit 213 is adjusted, and thereby the magnitude of the output voltage value ($V_{AC/DC}$) of the DC/DC converter unit 214 is adjusted. As a result, the voltage ($V_{BAT}$) applied to the battery is adjusted.

In a structure according to another embodiment of the present invention, the comparison voltage supply unit 310 may include a switch and a plurality of resistance elements, and may have a structure in which the plurality of resistance elements are connected in parallel with each other in accordance with an ON operation of the switch. In this case, the PFC control unit 218 allows the switch of the comparison voltage supply unit 310 to be turned on and off in accordance with the control signal of the control unit 118. By means of the resistance elements connected by the switch that is turned on and off in accordance with the control signal of the control unit 118, the voltage value ($V_{AC/DC}$) of the node 23 is converted, and the converted voltage value ($V_{AC/DC}$) is input to the first input terminal 1 of the comparator 301.

In a structure according to still another embodiment of the present invention, the comparison voltage supply unit 310 may be connected to the node 23 to convert the voltage value ($V_{AC/DC}$) of the node 23 in accordance with a predetermined criterion and supply the converted voltage value ($V_{AC/DC}$) to the first input terminal 1 of the comparator 301, and the PFC control unit 218, in this case, converts the reference voltage ($V_{ref}$) value of the reference voltage supply unit 320 in accordance with the control of the control unit 118 to supply the converted reference voltage ($V_{ref}$) value to the second input terminal 2 of the comparator 301 and changes the output voltage value of the comparator 301, whereby it is possible to change the duty value of the switch 2133 of the voltage adjustment unit 213.

In addition to the above-described pulse width modulation method, the PFC control unit 218 may include a Pulse Frequency Modulation (PFM) circuit to thereby adopt a pulse frequency modulation method, and in this case the PFC control unit 218 may change one period value of the switch of the voltage adjustment unit 213, namely, a switching frequency in accordance with the control of the control unit 118, thereby adjusting the magnitude of the output voltage value of the voltage adjustment unit 213.

In addition, the PFC control unit 218 may include a Pulse Density Modulation (PDM) circuit to thereby adopt a pulse density modulation method, and therefore the PFC control unit 218 may group a time when the switch 2133 of the voltage adjustment unit 213 is turned on in accordance with the control of the control unit 118, and control the switch, such as, for example, repeating the ON and OFF of the switch 2133 during the switch period 10 times, maintaining the OFF of the switch 2133 during the switch period times, or the like, thereby adjusting the magnitude of the output voltage value of the voltage adjustment unit 213.

In addition, in a case in which the above-described PFM or PDM method is adopted, the PFC control unit 218 may change other values other than the duty value of the switch 2133 of the voltage adjustment unit 213 such as in the PWM, when changing the reference voltage value (Vref) of the reference voltage supply unit 320 or the output voltage value of the comparison voltage supply unit 310 connected to the output terminal of the voltage adjustment unit 213 in accordance with the control of the control unit 118, and thereby adjusts the magnitude of the output voltage value of the voltage adjustment unit 213.

In addition, the PFC control unit 218 may adjust the voltage applied to the gate terminal of the MOSFET element which is the switch 2133 of the voltage adjustment unit 213 in accordance with the control of the control unit 118, and thereby control the ON and OFF operations of the switch.

Additionally, the above-described DC/DC control unit 2150 may adopt, for example, the PWM, the PFM, or the PDM in accordance with the control signal of the control unit 118, and thereby adjust the magnitude of the output voltage ($V_{DC/DC}$) value of the power output to the power transmission unit 216.

For example, the DC/DC control unit 2150 may include a PWM circuit, a PFM circuit, a PDM circuit, or the like, and thereby perform the adjustment of a switching operating frequency or a switching operating time of the switching unit 2140 in accordance with the control of the control unit 118, when receiving the voltage ($V_{AC/DC}$) of the node 23 and the voltage ($V_{DC/DC}$) of the node 28. That is, the DC/DC control unit 2150 may adjust the magnitude of the output voltage ($V_{DC/DC}$) value of the DC/DC converter 214 by performing the adjustment of a switching operating frequency or a switching operating time of the switching unit 2140 in accordance with the control of the control unit 118.

Meanwhile, in the above-described embodiment, a case in which the PFC control unit and the DC/DC control unit are respectively included in the voltage adjustment unit and the DC/DC converter unit has been described, but the PFC control unit 218 and the DC/DC control unit 2150 may alternatively be included in the control unit 118.

Referring back to FIG. 2B, the power receiver 230 may includes a resonance unit 2310, a rectification unit 2313, and a capacitor 2318.

The resonance unit 2310 includes a coil 2311 and a capacitor 2312 that is connected in series with the coil 2311.

The rectification unit 2313 is connected to the resonance unit 2310, and is a full-bridge circuit having four diodes Q1, Q2, Q3, and Q4 2314, 2315, 2316, and 2317, respectively. In addition, the capacitor 2318 may be connected in parallel with a resonant circuit.

A battery 233 is connected to a power reception unit 231, and represented by resistance ($R_L$), according to the embodiment of the present disclosure.

Since the battery 233 is made equivalent to the resistance ($R_L$), the battery charging current ($I_{chg}$) is generated into a desired type by controlling the voltage ($V_{BAT}$) applied to the battery 233. In addition, it can be seen that the voltage ($V_{BAT}$) applied to the battery 233 is adjusted in accordance with the voltage ($V_{AC/DC}$) of the node 23 or the voltage ($V_{DC/DC}$) of the node 28.

Figure 4:
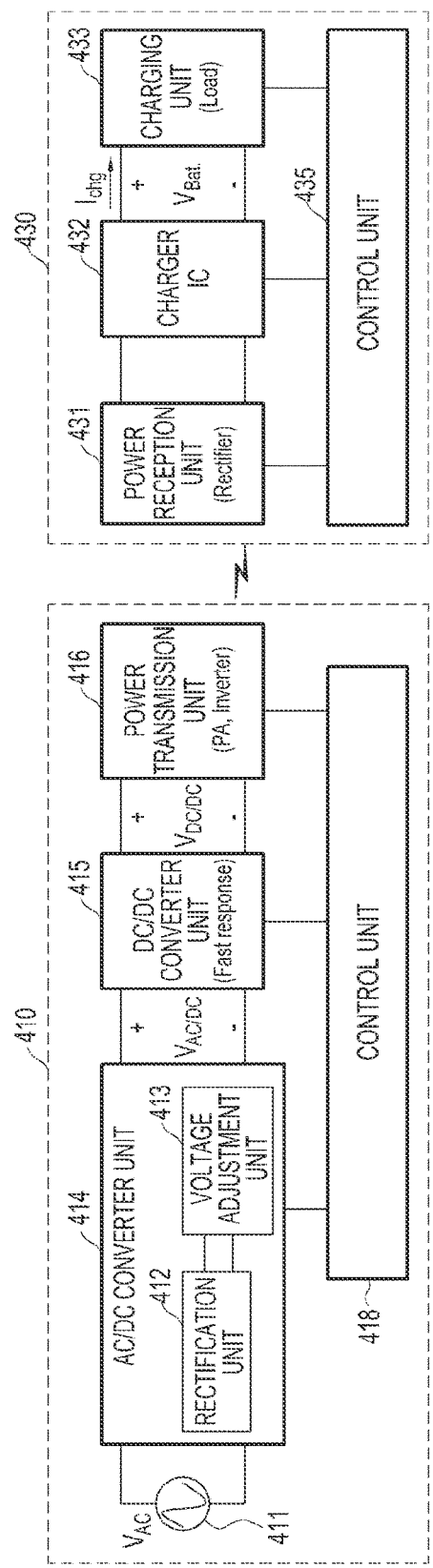
FIG. 4 is a block diagram of a wireless charging system, according to an embodiment of the present invention.

FIG. 4 is a block diagram of a wireless charging system, according to an embodiment of the present invention.

Referring to FIG. 4, a power transmitter 410 and a power receiver 430 of the wireless charging system are provided.

The power receiver 430 has a structure in which a charging IC 432 that connects the power reception unit 431 and the charging unit 433 is added between the power reception unit 431 and the charging unit 433 (i.e., the power reception unit 131 and the charging unit 133 from the configuration of the power receiver 130 of FIG. 1).

The DC/DC converter unit of the conventional power receiver can be removed because, according to an embodiment of the present invention, a DC/DC converter unit 415 of the power transmitter 410 generates a charging profile that is used in charging of a charging unit 433.

In the case of the wireless charging system including the power receiver 430 in which the charging IC 432 is added, the charging IC 432 has an effect of reducing the delay of the operating time, compared to the wireless charging system including the power receiver from which the charging IC is removed. For example, in the case of the wireless charging system including the power receiver from which the charging IC is removed, the power transmitter does not execute the function of the charging IC, and therefore, the delay of the operating time is likely to occur due to the transmission/reception of the signal. Thus, the wireless charging system including the power receiver 430 in which the charging IC 432 is added has the effect of reducing the delay of the operating time, compared to the wireless charging system including the power receiver from which the charging IC is removed.

The charging IC 432 is connected to the output terminal of a power reception unit 431, and supplies a charging current to the charging unit 433 in accordance with the control of the control unit 435. For example, the charging IC 432 may serve to adjust a high charging current and supply the adjusted charging current to the charging unit 433.

As illustrated in FIG. 4, the operation of each of a power supply unit 411, an AC/DC converter unit 414, the DC/DC converter unit 415, a power transmission unit 416, and a control unit 418 of the power transmitter 410, and the operation of each of the power reception unit 431, the charging unit 433, and the control unit 435 of the power receiver 430 have been described in detail with reference to FIG. 1, and thus descriptions thereof will be omitted herein.

Figure 5:
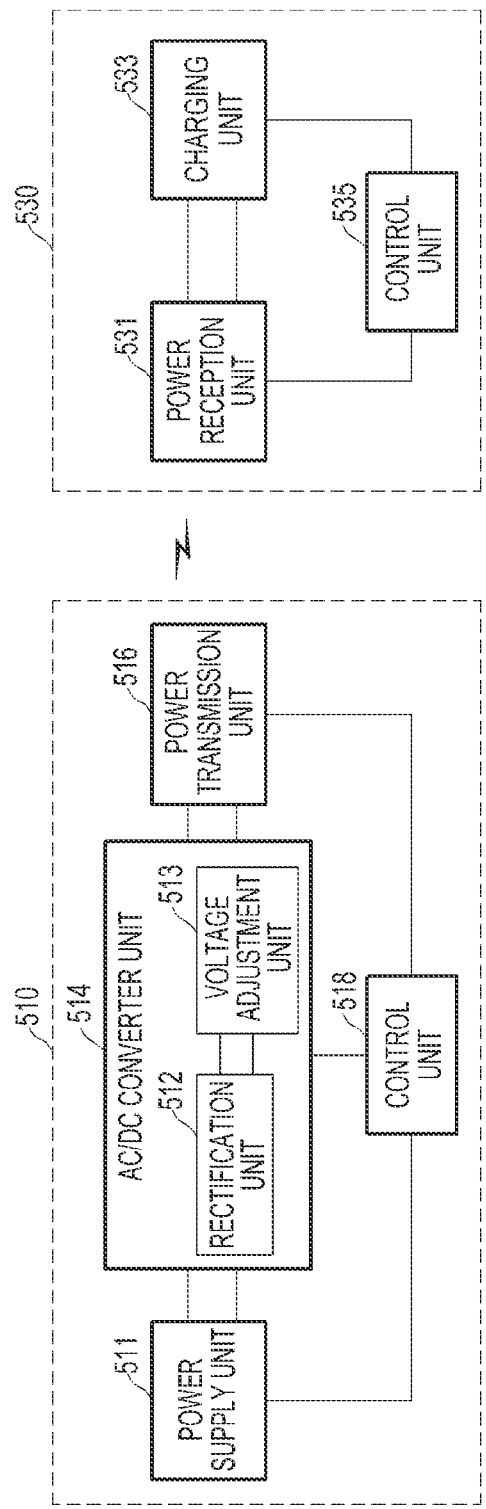
FIG. 5 is a block diagram of a wireless charging system, according to an embodiment of the present invention.

FIG. 5 is a block diagram of a wireless charging system, according to an embodiment of the present invention.

Referring to FIG. 5, a power transmitter 510 and a power receiver 530 of the wireless charging system are provided.

The power transmitter 510 has a structure in which the DC/DC converter unit 115 is removed from the configuration of the power transmitter 110 of FIG. 1. When a charging current is small, the charging of a battery is possible even without the DC/DC converter unit 115 of the power transmitter 110 in the wireless charging system of FIG. 1. In a case in which the charging power is small, when the DC/DC converter unit 115 is not provided, an AC/DC converter unit 514 of the power transmitter 510 generates a charging profile ($V_{BAT}$, $I_{chg}$) that is used in the charging of a charging unit 533, for example, the battery, and therefore, the above-described DC/DC converter unit and charging IC of the conventional power receiver may be removed. The configuration and operation of each of a power supply unit 511, the AC/DC converter unit 514, a power transmission unit 516, and a control unit 518 of the power transmitter 510, and the configuration and operation of each of a power reception unit 531, the charging unit 533, and a control unit 535 of the power receiver 530 have been described in detail with reference to FIG. 1, and thus descriptions thereof will be omitted herein.

Figure 6:
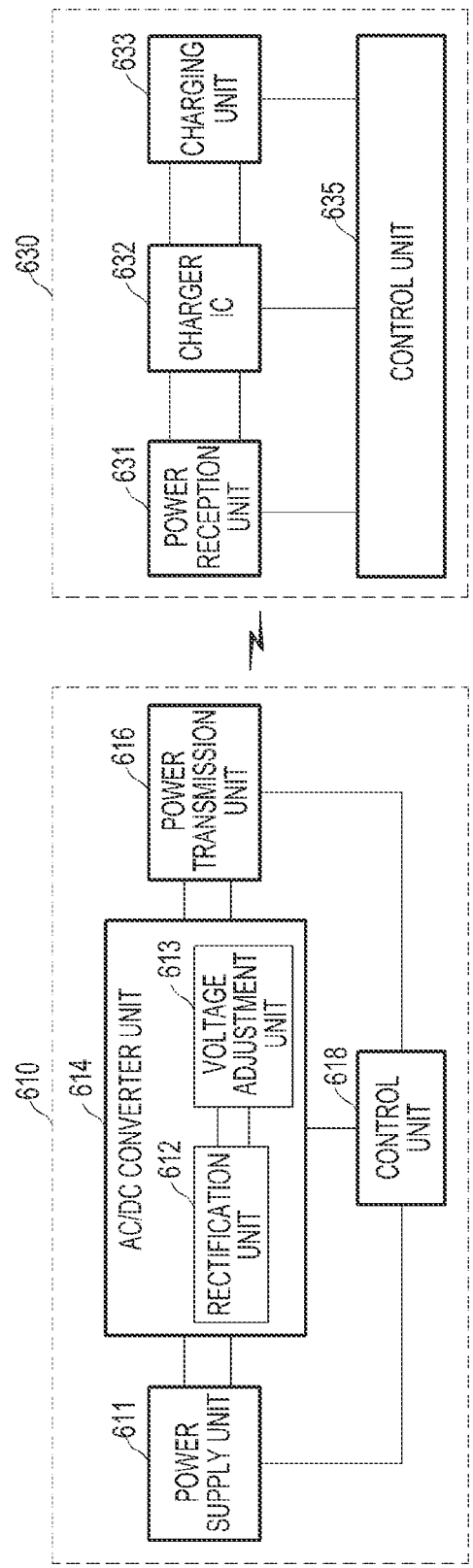
FIG. 6 is a block diagram of a wireless charging system, according to an embodiment of the present invention.

FIG. 6 is a block diagram of a wireless charging system, according to an embodiment of the present invention.

Referring to FIG. 6, a power transmitter 610 and a power receiver 630 of the wireless charging system are provided. The power receiver 630 has a structure in which a charging IC 632 that connects the power reception unit 631 and the charging unit 633 is added between the power reception unit 631 and the charging unit 633 (i.e., the power reception unit 531 and the charging unit 533 from the configuration of the power receiver 530 of FIG. 5).

The DC/DC converter unit 115 of the power transmitter 110 of FIG. 1 as well as the DC/DC converter unit of the conventional power receiver can be removed because the AC/DC converter unit 614 of the power transmitter 610 generates a charging profile that is used in the charging of the charging unit 633.

In the case of the wireless charging system including the power receiver 630 in which the charging IC 632 is added, the charging IC 632 may have an effect of reducing the delay of the operating time, compared to the wireless charging system including the power receiver from which the charging IC is removed.

The operation of each of the power supply unit 611, the AC/DC converter unit 614, a power transmission unit 616, and a control unit 618 of the power transmitter 610 and the operation of each of the power reception unit 631, the charging IC 632, the charging unit 633, and a control unit 635 of the power receiver 630 have been described in detail with reference to FIG. 1, and thus descriptions thereof will be omitted herein.

Figure 7:
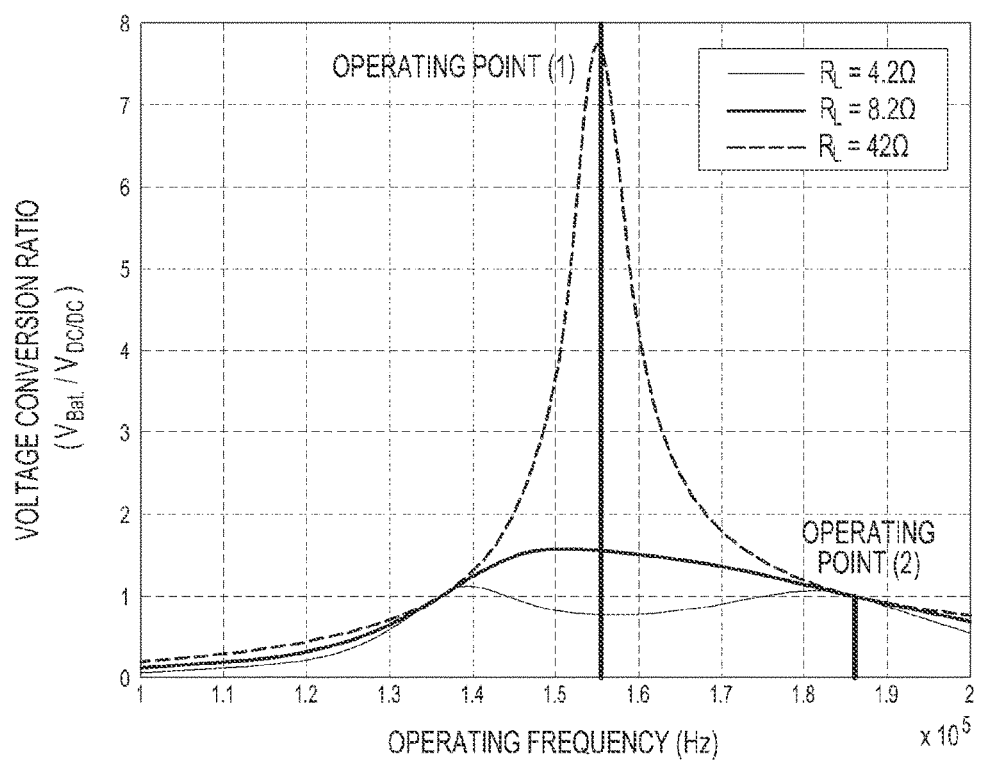
FIG. 7 is a graph illustrating a voltage conversion ratio of an input voltage ($V_{DC/DC}$) of a power transmission unit and a voltage ($V_{BAT}$) applied to a battery, according to an embodiment of the present invention.

FIG. 7 is a graph illustrating a voltage conversion ratio of an input voltage ($V_{DC/DC}$) of a power transmission unit and a voltage ($V_{BAT}$) applied to a battery, according to an embodiment of the present invention.

Referring to FIG. 7, it is shown that the voltage ($V_{BAT}$) applied to the battery is adjustable in accordance with the setting of the operating frequency even in the same resistance ($R_L$) state. When the operating frequency is changed, there may be problems, such as the low operating efficiency of the wireless charging system, the generation of a lot of harmonic waves, etc., whereby it is advantageous that the wireless charging system is operated at a fixed frequency. Thus, in order to adjust the voltage ($V_{BAT}$) applied to the battery at the fixed frequency, the input voltage ($V_{DC/DC}$) of the power transmission unit should be adjusted. The input voltage ($V_{DC/DC}$) of the power transmission unit is controlled by adjusting a control factor of the AC/DC converter unit or the DC/DC converter unit, as described above.

Figure 8:
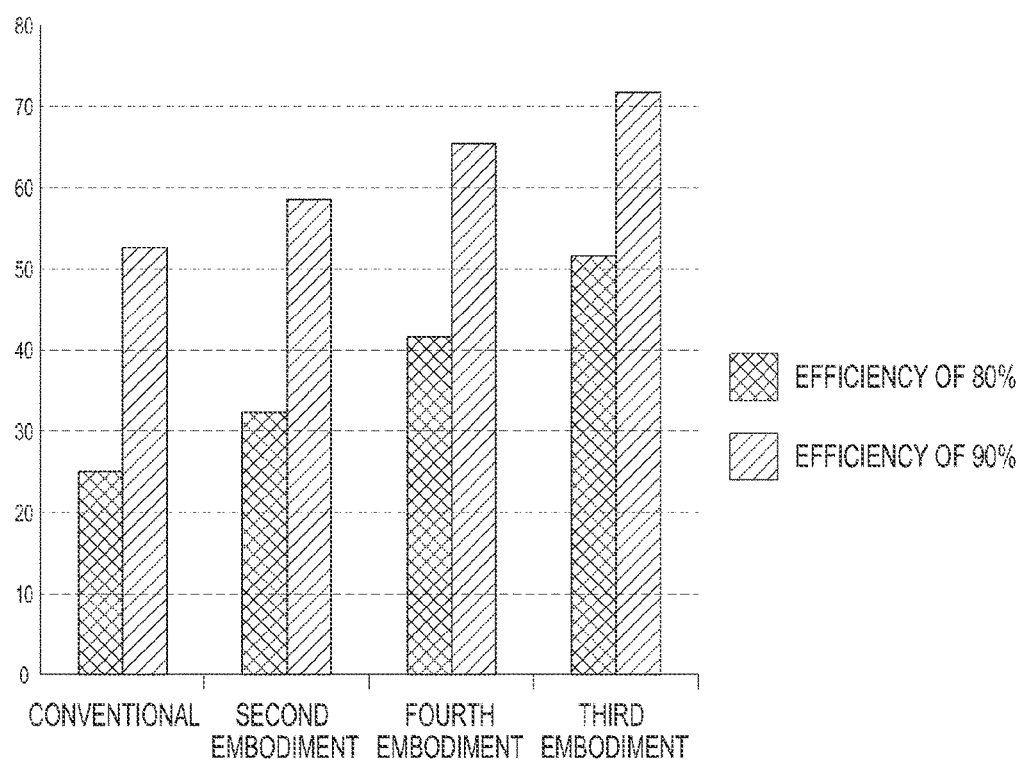
FIG. 8 is a comparison graph illustrating the efficiency of each power conversion unit and an amount of power transmitted to a battery, according to various embodiments of the present invention.
Figure 9:
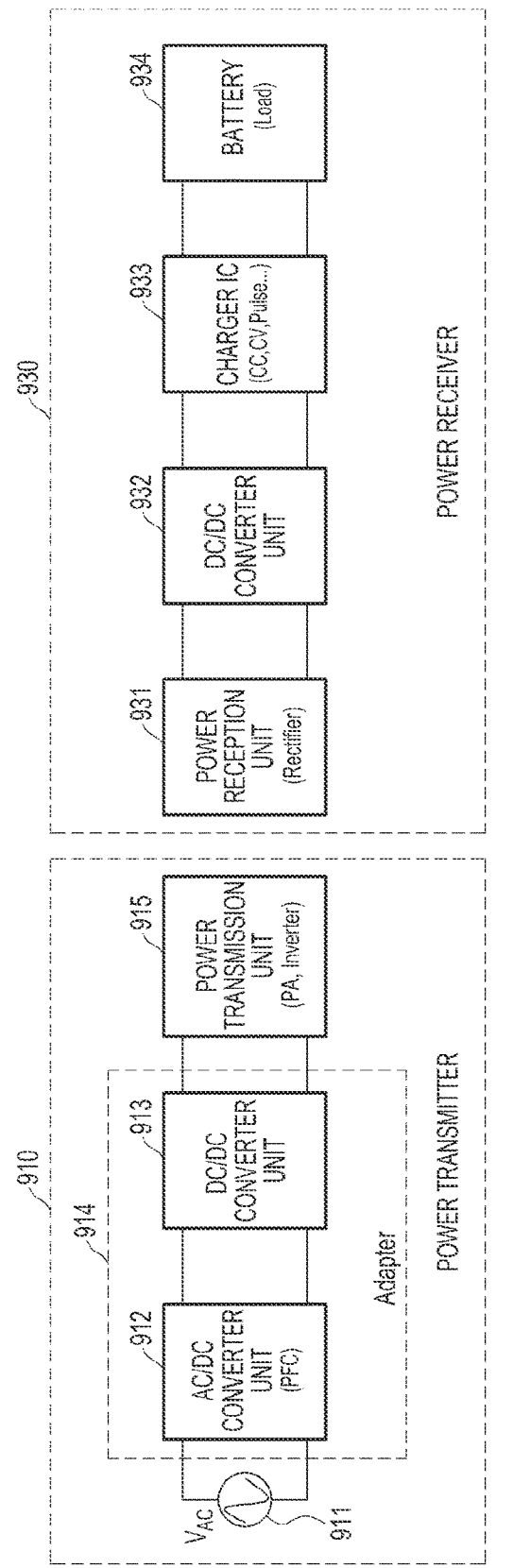
FIG. 9 is a block diagram of a conventional wireless charging system, according to the related art.
Figure 10:
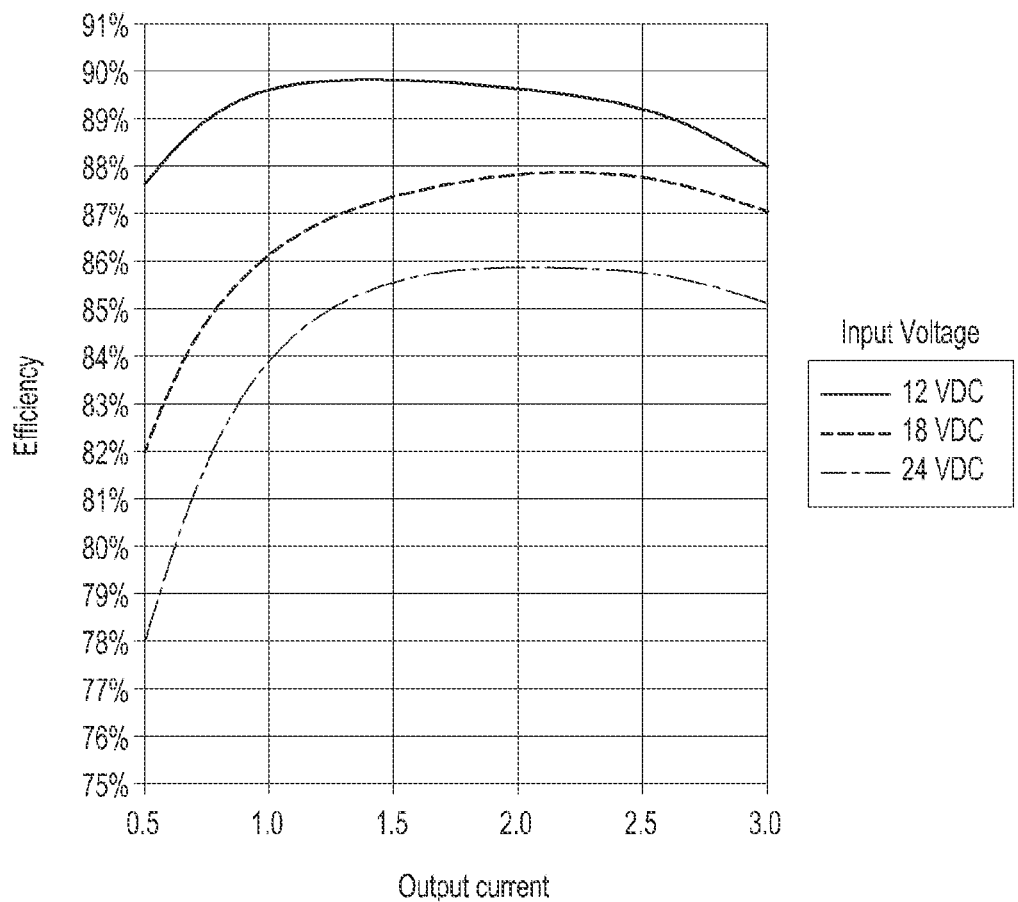
FIG. 10 is a graph illustrating efficiency characteristics in accordance with an output current and an input voltage of a conventional DC/DC converter unit, according to the related art.
Figure 11:
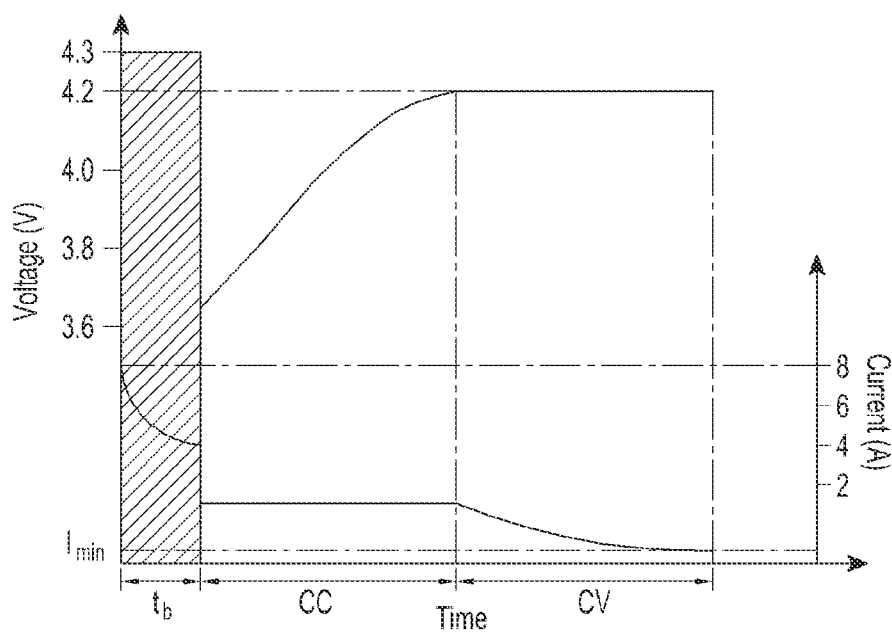
FIG. 11 is a graph illustrating a profile of a boost charging technology among conventional rapid charging technologies, according to the related art.

FIG. 8 is a comparison graph illustrating the efficiency of each power conversion unit and an amount of power transmitted to a battery, according to various embodiments of the present invention.

Referring to FIG. 8, it is assumed that each of the AC/DC converter unit, the DC/DC converter unit, the power transmission unit, the power reception unit, and the charging IC is a power conversion unit. FIG. 8 provides a comparison of the efficiency of each power conversion unit and an amount of power transmitted to a battery, according to various embodiments of the present invention (e.g., the conventional wireless charging system, the wireless charging system according to the embodiment of FIG. 4, the wireless charging system according to the embodiment of FIG. 5, and the wireless charging system according to the embodiment of FIG. 6). As shown in FIG. 8, a larger amount of power can be supplied to the battery under the same power condition, as the configuration of the wireless charging system becomes simplified.

According to various embodiments of the present invention, the technology that controls the voltage applied to the battery is adopted to adjust the battery charging current, and therefore, the battery charging current can be adjusted to enable rapid charging by controlling the voltage of the AC/DC converter unit or the DC/DC converter unit, within a maintaining time (e.g., several msec to several hundred msec) of a current for rapid charging in order to rapidly charge the battery.

For example, when the battery requires a current change within the several msec the configuration including both the AC/DC converter unit and the DC/DC converter unit may be implemented, such as in the wireless charging system described with respect to FIG. 1 or FIG. 4. When the charging current is small, a configuration only using the AC/DC converter unit without the DC/DC converter unit may be implemented such as in the wireless charging system described with respect to FIG. 5 or FIG. 6. In addition, when the battery to be charged requires a rapid charging current change within several hundred msec a current change enabling desired rapid charging may be generated only by controlling the output voltage of the AC/DC converter unit without the DC/DC converter unit. Thus, by simplifying the entire wireless charging system, it is possible to rapidly charge the battery while implementing the wireless power transmission method.

The elements or/and circuits of the respective components according to the various embodiments of the present invention are merely examples, and it will be easily understood by those skilled in the art that the elements or/and circuits of the respective components are changeable by applying various examples. For example, as the DC/DC converter unit, a flyback DC/DC, a forward DC/DC converter, a buck converter, a buck boost converter, etc. may be applicable.

According to various embodiments of the present invention, each of the above-described constituent components of the wireless power transmitter and the wireless power receiver may be constituted of one or more components, and the name of the corresponding components may be changed. The wireless power transmitter and the wireless power receiver may include one or more of the above-described components, and some components may be omitted or other additional components may be further included. In addition, some among the constituent components of the wireless power transmitter and the wireless power receiver may be combined to configure a single entity, and therefore the functions of the corresponding components before the combination may be performed in the same manner.

It will be appreciated that the embodiments of the present invention may be implemented in a form of hardware, software, a combination of hardware and software. Regardless of being erasable or re-recordable, such an optional software may be stored in a non-volatile storage device such as a ROM, a memory such as an RAM, a memory chip, a memory device, or an integrated circuit, or a storage medium such as a CD, a DVD, a magnetic disc, or a magnetic tape that is optically or electromagnetically recordable and readable by a machine, for example, a computer. The storage unit included in the electronic device is one example of the machine-readable storage media suitable for storing a program or programs including commands for implementing various embodiments of the present invention. Accordingly, the present invention includes a program that includes instructions for implementing an apparatus or a method of the present invention and a machine-readable storage medium that stores such a program. Further, the program may be electronically transferred by a predetermined medium, such as a communication signal transferred through a wired or wireless connection, and the present disclosure appropriately includes equivalents of the program.

Embodiments of the present invention provided in the present specification and drawings are merely examples to readily describe the technology associated with the present invention and to help in understanding the present invention, but do not limit the scope of the present invention. Therefore, in addition to the embodiments disclosed herein, the scope of the present invention should be construed to include all modifications or modified forms drawn based on the technical idea of the various embodiments of the present invention. Accordingly, the scope of the present invention is defined not by the detailed description of the present invention, but by the appended claims and their equivalents, and thus, all differences within the scope will be construed as being included in the present invention.

What is claimed is:

1. A wireless power transmitter comprising:
a power supply circuit configured to supply power;
a rectification circuit configured to rectify the power received from the power supply circuit;
a processor configured to generate a first signal for adjusting a magnitude of the rectified power based on a predetermined reference voltage and a voltage corresponding to the rectified power;
a voltage adjustment circuit configured to adjust the magnitude of the rectified power according to the first signal;
the power transmission circuit configured to generate power by using the rectified power of which the magnitude is adjusted and transmit the generated power to a wireless power receiver.

2. The wireless power transmitter of claim 1, wherein the voltage adjustment circuit includes a switch configured to be turned on or turned off according to the first signal, and
wherein the voltage adjustment circuit is further configured to adjust the magnitude of the rectified power by turning the switch on or off according to the first signal.

3. The wireless power transmitter of claim 2, wherein the voltage adjustment circuit is further configured to control a frequency of the switch to be turned on and a time during which the switch is turned on according to the first signal.

4. The wireless power transmitter of claim 2, wherein the processor is further configured to:
convert the voltage corresponding to the rectified power, and
generate the first signal for adjusting the magnitude of the rectified power based on the predetermined reference voltage and the converted voltage.

5. The wireless power transmitter of claim 4, wherein the processor comprises:
a comparator configured to:
receive the predetermined reference voltage and the converted voltage,
compare the predetermined reference voltage and the converted voltage, and
generate an output signal having a voltage corresponding to a difference between the predetermined reference voltage and the converted voltage; and
a modulation circuit configured to:
receive the output signal from the comparator, and
generate the first signal for adjusting the magnitude of the rectified power based on the output signal.

6. The wireless power transmitter of claim 5, wherein the voltage adjustment circuit is one of a step-down circuit, a step-up circuit, and a step-up down circuit.

7. The wireless power transmitter of claim 1, further comprising:
a Direct Current (DC)/DC converter circuit configured to convert power,
wherein the processor is further configured to:
control the DC/DC converter circuit to convert the rectified power of which the magnitude is adjusted according to a predetermined gain, and
transmit the converted power to the power transmission circuit.

8. The wireless power transmitter of claim 1, wherein the processor further configured to:
generate a second signal for adjusting a magnitude of the rectified power of which the magnitude is adjusted according to the first signal, based on the predetermined reference voltage and a voltage corresponding to the rectified power of which the magnitude is adjusted.

9. The wireless power transmitter of claim 8, wherein the voltage adjustment circuit includes a switch configured to be turned on or turned off according to the second signal, and
wherein the voltage adjustment circuit is further configured to adjust the magnitude of the rectified power of which the magnitude is adjusted according to the first signal, by turning on or off the switch according to the second signal.

10. A method for transmitting power by a wireless power transmitter, the method comprising:
rectifying power supplied from a power supply circuit of the wireless power transmitter;
generating a first signal for adjusting a magnitude of the rectified power based on a predetermined reference voltage and a voltage corresponding to the rectified power;
adjusting the magnitude of the rectified power according to the first signal;
generating power by using the rectified power of which the magnitude is adjusted; and
transmitting the generated power to a wireless power receiver.

11. The method of claim 10, wherein adjusting the magnitude of the rectified power according to the first signal comprises:
adjusting the magnitude of the rectified power by turning on or off a switch of the wireless power transmitter according to the first signal.

12. The method of claim 11, wherein adjusting the magnitude of the rectified power according to the first signal further comprises:

controlling a frequency of the switch to be turned on and a time during which the switch is turned on according to the first signal.

13. The method of claim 11, wherein generating the first signal for adjusting the magnitude of the rectified power comprises:
    converting the voltage corresponding to the rectified power; and
    generating the first signal for adjusting the magnitude of the rectified power based on the predetermined reference voltage and the converted voltage.

14. The method of claim 13, wherein generating the first signal for adjusting the magnitude of the rectified power further comprises:
    comparing the predetermined reference voltage and the converted voltage;
    generating an output signal having a voltage corresponding to a difference between the predetermined reference voltage and the converted voltage;
    generating the first signal for adjusting the magnitude of the rectified power based on the output signal.

15. The method of claim 10, further comprising:
    converting the rectified power of which the magnitude is adjusted according to a predetermined gain.

16. The method of claim 10, further comprising:
    generating a second signal for adjusting a magnitude of the rectified power of which the magnitude is adjusted according to the first signal, based on the predetermined reference voltage and a voltage corresponding to the rectified power of which the magnitude is adjusted.

17. The method of claim 16, further comprising:
    adjusting the magnitude of the rectified power of which the magnitude is adjusted according to the first signal, by turning on or off the switch according to the second signal.

* * * * *